United States Patent [19]

Gönner

[11] 4,262,879

[45] Apr. 21, 1981

[54] APPARATUS FOR SWITCHING FLUID FLOW

[75] Inventor: Winfried Gönner, Uberlingen, Fed. Rep. of Germany

[73] Assignee: Bodenseewerk Perkin-Elmer & Co., Fed. Rep. of Germany

[21] Appl. No.: 42,691

[22] Filed: May 25, 1979

[30] Foreign Application Priority Data

May 31, 1978 [DE] Fed. Rep. of Germany ....... 2823775

[51] Int. Cl.[3] ........................ F16K 31/44; F16K 1/00; F16K 17/04

[52] U.S. Cl. ............................... 251/230; 137/624.13; 137/872; 137/881

[58] Field of Search .................. 251/230; 137/624.13, 137/871, 872, 881; 74/56, 57

[56] References Cited

U.S. PATENT DOCUMENTS

| | | | |
|---|---|---|---|
| 1,644,171 | 10/1927 | Caldwell | 251/230 |
| 3,147,770 | 9/1964 | Perlis | 137/624.13 |
| 3,220,695 | 11/1965 | Downey et al. | 251/230 |
| 4,067,358 | 1/1978 | Strech | 251/230 |

FOREIGN PATENT DOCUMENTS

| | | |
|---|---|---|
| 677376 | 8/1952 | United Kingdom . |
| 1160821 | 8/1969 | United Kingdom . |

*Primary Examiner*—Martin P. Schwadron
*Assistant Examiner*—A. Michael Chambers
*Attorney, Agent, or Firm*—S. A. Giarratana; E. T. Grimes; R. A. Hays

[57] ABSTRACT

The fluid flow switching apparatus includes a housing defining a chamber, a bore in communication with the chamber, fluid inlet and outlet ports respectively in communication with the chamber and bore, and a valve body movable within the chamber and carrying a sealing means for sealing about the bore. The valve body carries a pin which projects laterally into a cam track formed in the housing and which serves to releasably lock the valve body in a position enabling flow between the inlet and outlet ports through the chamber and bore and in a valve closed position preventing flow between the inlet and outlet ports. The valve body is movable manually between the valve open and closed positions by consecutive depressions of a push key connected to the valve body.

8 Claims, 7 Drawing Figures

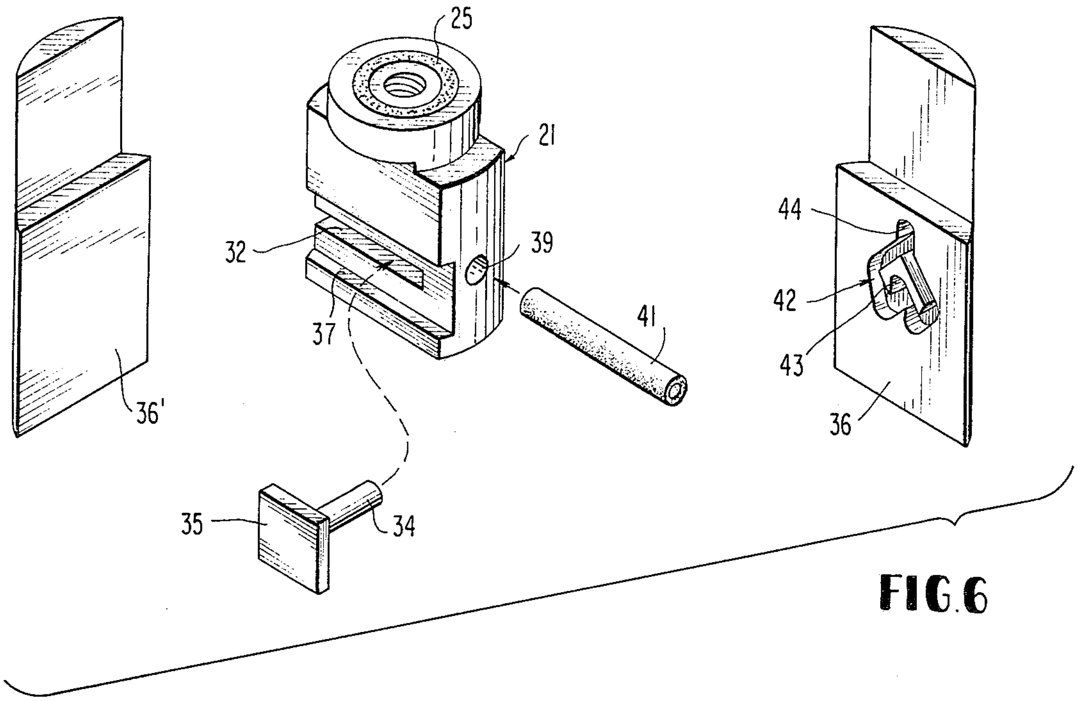
FIG.6
FIG.7
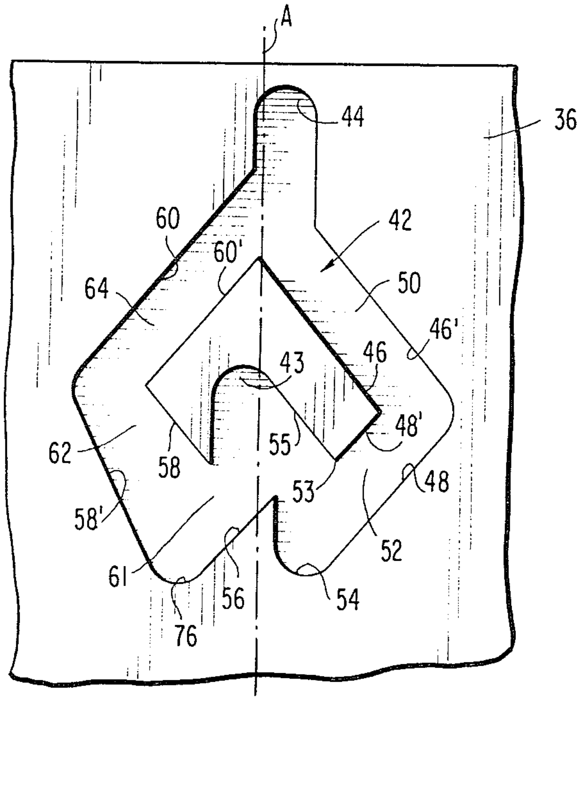
FIG.5
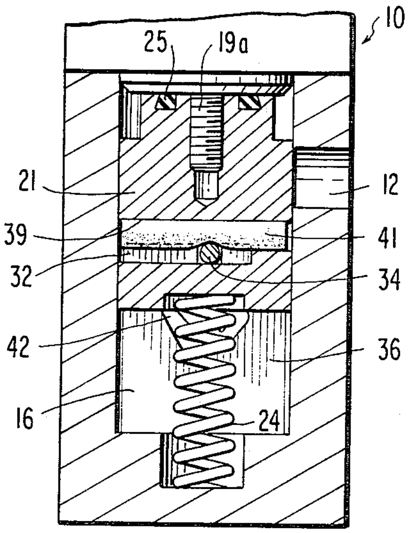

APPARATUS FOR SWITCHING FLUID FLOW

BACKGROUND OF THE INVENTION

The present invention relates to apparatus for switching fluid flow and particularly relates to a fluid valving device for controlling fluid communication between fluid inlet and outlet ports under control of a push key.

A multitude of fluid valves have been proposed and constructed in the past. Many are complex in structure and operation. This often precludes their use in different applications, for example, pneumatic flow switching apparatus for analytical instruments such as atomic absorption spectrometers. There is also a need for arranging fluid switching apparatus adjacent one another for connection in parallel to permit digital setting of a fluid flow by manual actuation of the valves.

SUMMARY OF THE INVENTION

Accordingly, it is a primary object of the present invention to provide a novel and improved switching apparatus for fluid flow.

It is another object of the present invention to provide a novel and improved switching apparatus for fluid flow which is compact in construction enabling its use in scientific instruments, such as atomic absorption spectrometers.

It is still another object of the present invention to provide a novel and improved switching apparatus for fluid flow having a valve which is manually actuated by means of a pushbutton or push key.

It is a further object of the present invention to provide a novel and improved switching apparatus for fluid flow having manually actuated valves capable of arrangement and connection in parallel to enable digital setting of fluid flow by manual actuation of a push key or push button.

Additional objects and advantages of the invention will be set forth in part in the description which follows, and in part will be obvious from the description, or may be learned by practice of the invention. The object and advantages of the invention may be realized and obtained by means of the instrumentalities and combinations particularly pointed out in the appended claims.

To achieve the foregoing objects and in accordance with the purpose of the present invention, as embodied and broadly described herein, the switching apparatus of the present invention comprises; a housing having first and second fluid ports, the housing defining a chamber, a bore in communication with the chamber, and a sealing face in the chamber about the bore, the first and second fluid ports lying in communication with the chamber and the bore respectively, valve means carried by the housing including a valve body in the chamber and seal means carried by the valve body, the valve body being moveable in the chamber between a first position with the seal means engaging the sealing face to prevent fluid communication between the bore and the chamber and a second position spaced from the sealing face providing for fluid communication between the bore and the chamber, actuating means carried by the housing and coupled to the valve body for moving the valve body alternately between the first and second positions thereof, means for biasing the valve body for movement toward one of the first and second positions, and means carried by the housing for locking the valve body in the one of the first and second positions and releasing the valve body from the one of the first and second positions respectively in response to consecutive actuations of the switch actuating means.

Preferably, the switch actuating means includes a push key movable toward the valve housing against the bias of a biasing means tending to move the valve body toward a first position precluding communication between the fluid inlet and outlet ports. The valve body includes a transverse slot which receives a pin engagable in a cam track. The cam track guides the pin to lock the valve body in the first and second positions in response to linear movement of the valve body upon consecutive actuations of the push key or push button. By carrying the locking device within the valve body, the switching device may be compact and simple in construction.

The invention consists in the novel parts, constructions, arrangements, combinations and improvements shown and described. The accompanying drawings, which are incorporated in and constitute a part of this specification, illustrate one embodiment of the invention and, together with the description, serve to explain the principle of the invention.

DESCRIPTION OF THE DRAWING FIGURES

FIG. 5 is a fragmentary cross sectional view thereof taken generally about on line V—V in FIG. 1;

FIG. 6 is a exploded perspective view of the parts disposed in the valve chamber of the fluid switching apparatus hereof with the left hand block 36' turned from its normal position butting valve closure 21; and FIG. 7 is an enlarged fragmentary elevational view of the cam surfaces in the side face of cam 36.

DESCRIPTION OF A PREFERRED EMBODIMENT

Reference will now be made in detail to the present preferred embodiment of the present invention, an example of which is illustrated in the accompanying drawings.

Figure 1:
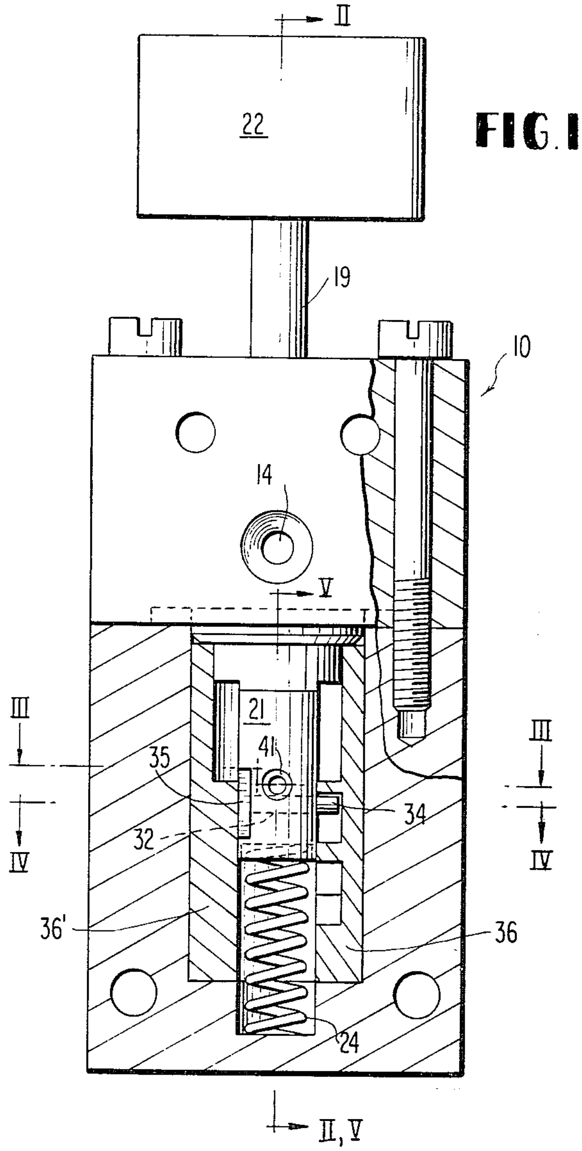
FIG. 1 is a side elevational view with parts broken out and in cross-section of a fluid switching apparatus constructed in accordance with the present invention.
Figure 2:
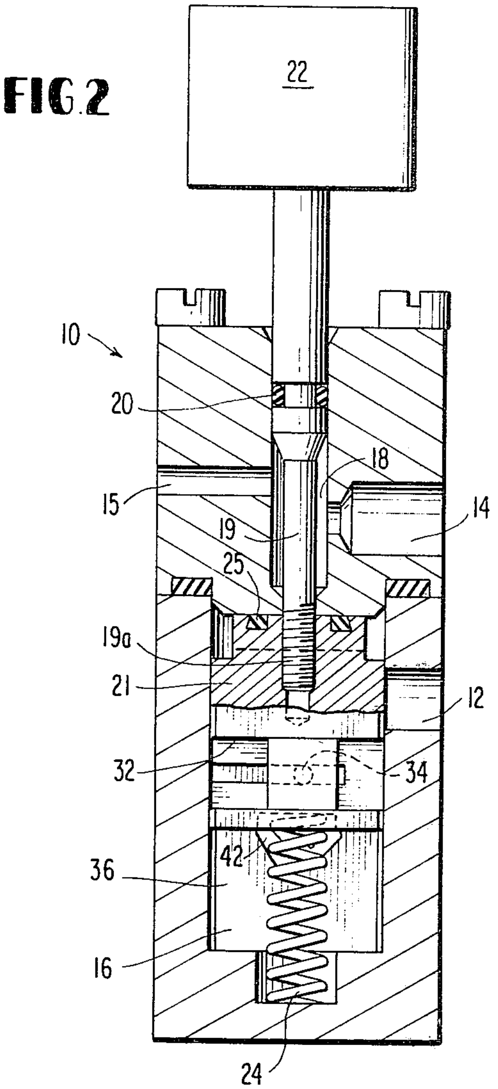
FIG. 2 is a cross-sectional view thereof taken generally about on line II—II in FIG. 1.

Referring now to FIGS. 1 and 2, there is illustrated a fluid switching device constructed in accordance with the present invention comprising a housing, generally designated 10, having a fluid inlet port 12 and a pair of fluid outlet ports 14 and 15. Fluid inlet port 12 communicates with both fluid outlet ports 14 and 15 through a chamber 16 formed at the lower end of housing 10 and a bore 18 opening through the upper end of housing 10. Bore 18 receives an actuating rod 19 having a sealing ring 20 for sealing between rod 19 and bore 18. A valve closure body 21 is received in chamber 16 and carries a reduced diameter portion of rod 19 which projects from body 21 upwardly into and out of bore 18. Actuating rod 19 carries a push key or push button 22 at its upper external end whereby, upon pushing key 22 toward housing 10, rod 19 may be depressed to move valve closure body 21 against the bias of a helical spring 24 disposed between the end wall of chamber 16 and the lower face of valve closure body 21. The upper face of valve closure body 21 carries an annular groove in which a seal ring 25 is received for sealing against the sealing face about bore 18 when the valve closure body lies in its first position sealing between fluid inlet port 12 and fluid outlet ports 14 and 15. Consequently, when the valve closure body lies in its first position, fluid communication between fluid inlet 12 and fluid outlets 14 and 15 is prevented whereas, when valve closure body 21 lies in a second position in response to a depression of push key 22 which displaces the closure body 21 away from its sealing engagement about bore 16, communication between the fluid inlet port 12 and fluid outlet ports 14 and 15 is provided.

Figure 3:
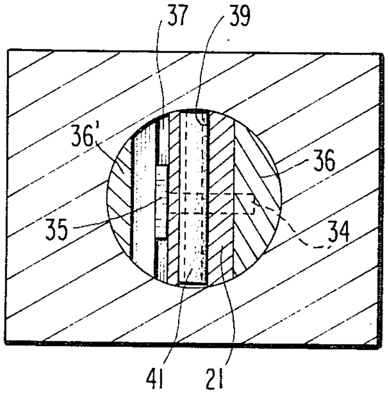
FIG. 3 is a cross-sectional view thereof taken generally about on line III—III in FIG. 1.
Figure 4:
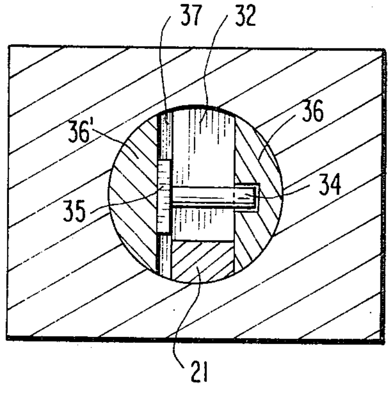
FIG. 4 is a cross-sectional view thereof taking generally about on line IV—IV in FIG. 1.

A locking mechanism is provided to lock the valve closure body 21 in its second position permitting fluid communication between fluid inlet port 12 and fluid outlets 14 and 15. The locking device is constructed to enable the valve closure member to move beyond or through its second position when moved from its first position into a locked second position. The locking mechanism is also responsive to consecutive depressions of push key 22 to unlock closure body 21 for movement from its first position sealing between the fluid inlet and outlet ports into its second locking position enabling communication between such ports, and to unlock the closure body from its locked second position for return to its first position, respectively. The valve closure body 21 is of course, longitudinally slidable in chamber 16. Body 21 has a transversely extending slot 32 for guiding a pin 34 receivable in slot 32. The tip of pin 34 engages the track of a cam 36 for releasably locking the valve closure body in the first and second positions. Referring to FIGS. 2, 3 and 4, pin 34 has a rectangular base 35 which is received in a shallow rectangular recess 37 disposed in one wide side face of the body 21 and in registry with slot 32. Cam 36 is located adjacent the opposite side of closure body 21 from its wide side face. A small tube 41 is received in a bore 39 and projects into slot 32 for bearing engagement along pin 34 as the pin is slidable transversely across slot 32. Thus, pin 34 is braked in its transverse sliding movement in slot 32 by the cooperation of the rectangular head 35 bearing in rectangular recess 36, the engagement of the tip of pin 34 in the track of cam 36, the head 35 bearing against block 36' in chamber 16 and the braking action of the tube 41 bearing against the pin 34. Thus, it clearly follows, that the pin 34 necessarily closely follows the cam 36.

Referring now to FIG. 7, it will be appreciated that cam 36 has a vertical axis A including a cam track 42 comprised of a groove or slot formed in a side face of cam 36. Track 42 includes upper and lower recesses 44 and 43 respectively, axially spaced one from the other. Each of recesses 43 and 44 define a locking position. The guide slot or cam track 42 has first and second cam surfaces 46 and 48 which, with opposed surfaces 46' and 48' respectively, define respective cam track segments 50 and 52. The first cam surface 46 is inclined away from axis A while the second cam surface 48 is inclined toward axis A to terminate in a surface 54 substantially axially below recess 43. Cam 36 includes a third cam surface 55 leading from cam track segment 52 upwardly to the high point in recess 43. Cam 36 also includes a fourth cam surface 56 inclined away from axis A and disposed substantially axially below recess 43. Additional fifth and sixth cam surfaces 58 and 60, respectively incline away from and toward the axis A, are also provided and which together with opposed surfaces 58' and 60' define additional respective cam track segments 62 and 64. Cam track section 64 terminates at its upper end in recess 44.

It will be appreciated that cam surfaces 46 and 48 with respective opposing surfaces 46' and 48' and cam track segments 50 and 52 respectively defined thereby comprise a first cam track section while third cam surface 55 and recess 43 define a second cam track section. These two cam track sections serve to guide pin 34 into position to lock the valve closure body 21 in a valve open or second position as will be clear from the ensuing description. It will be further appreciated that cam surface 56 defines a third cam track section between the high point of recess 43 and the low point 76 of the cam track segment 62 defined by surfaces 58 and 58'. Further, cam surfaces 58 and 60 with respective opposing surfaces 58' and 60' and cam track segments 62 and 64 respectively defined thereby comprise a fourth cam track section serving to guide pin 34 into position to lock the valve closure body 21 in a valve closed or first position as will be clear from the ensuing description.

As will be apparent from a review of FIG. 1, cam 36 is fixed in and forms an integral part of the housing that is, it resides in chamber 16 on the side thereof opposite the head 35 of pin 34 and block 36'. Thus, upon consecutive depressions of push key 22, the valve closure body is movable from its first position into its locked second position to provide for fluid communication between the fluid inlet and outlet ports and is releasable from the locked second position for return to its first position to enable the valve body to seal about bore 18 and prevent communication between the fluid inlet and outlet ports. Particularly, with the switching apparatus in its first or sealing position, valve closure body 21 is biased by spring 24 such that seal ring 25 seals about the lower end of bore 18 and prevents communication between fluid inlet port 12 and fluid outlet ports 14 and 15, respectively. In this position, the tip of pin 34 is disposed in recess 44 of the cam track. Upon actuating the switching mechanism by depressing push button 22, the tip of pin 34 is displaced out of recess 44 and engages the first cam surface 46 for movement therealong and also cam track segment 50 upon continued depression of key 22. Thus, pin 34 slides transversely in slot 32 laterally away from axis A and, when sliding, is braked by tubing 41. Upon further depression of key 22, the tip of pin 34 engages the second cam surface 48 in cam track segment 52 of cam 36 and is displaced laterally toward axis A for disposition below the tip 53 defining the entrance to recess 43 opposite the lower end of third cam surface 54. When the tip of pin 34 reaches the lower end or low point in the second cam track segment 52 adjacent surface 54, valve closure body 21 will move under the action of spring 24 upwardly toward bore 18 upon release of key 22. However, upward movement of body 21 will be arrested by the engagement of the tip of pin 34 in cam recess 43. It will be appreciated from a review of FIG. 7 that this arresting action is brought about by engagement of the tip of pin 34 along cam surface 55 leading to the high point in recess 43. Thus, pin 34 arrests the movement of body 21 and locks it in position with sealing ring 25 spaced from the sealing face about bore 18. With body 21 locked in this second position, fluid communication is provided between inlet port 12 and outlet ports 14 and 15 through chamber 16 and bore 18.

To preclude fluid communication between the inlet and outlet ports, push key 22 is once again depressed.

When depressed, pin 34 will move axially downwardly with body 21 such that its tip engages third cam surface 56. Further depression of key 22 causes pin 34 to be displaced laterally to the low point 76 of third cam track segment 61 to a location below forth cam surface 58. Upon release of key 22, spring 24 causes valve closure body 21 to move upwardly toward bore 18 with the tip of pin 34 following along the fourth and fifth cam track segments 62 and 64 respectively and finally moving into upper recess 44. At the time the pin engages in recess 44, sealing ring 25 of valve closure body 21 engages about bore 18 to preclude fluid communication between the inlet and outlet ports. Consequently, it will be appreciated that the action of the pin in the cam track enables valve closure body 21 to be respectively locked in its valve open or second position and in its valve closed or first position upon consecutive depressions or actuations of push key 22 commencing initially when valve closure body 21 lies in its uppermost closed first position. It will be understood that the term fluid as used herein encompasses both liquid and gas.

It will be apparent to those skilled in the art that various modifications and variations can be made in the fluid switching apparatus of the present invention without departing from the scope or spirit of the invention.

What is claimed is:

1. Apparatus for switching fluid flow comprising:

a housing having first and second fluid ports, said housing defining a chamber, a bore in communication with said chamber, and a sealing face in said chamber about said bore, said first and second fluid ports lying in communication with said chamber and said base respectively, valve means carried by said housing including a valve body in said chamber and seal means carried by said valve body, said valve body being movable in a linear direction in said chamber between a first position with said seal means engaging said sealing face to prevent fluid communication between said bore and said chamber and a second position spaced from said sealing face providing for fluid communication between said bore and said chamber, said valve body having a slot extending transversely to the direction of movement thereof, actuating means carried by said housing and coupled to said valve body for moving said valve body alternately between said first position and said second position, means for biasing said valve body for movement toward one of said first and second position, means fixed in and forming a integral part of said housing for locking said valve body in said one of said first and second position and releasing said valve body from said one of said first and second positions respectively in response to consecutive actuation of said actuating means, said locking means including a cam carried by said housing and having first and second cam track sections, said first cam track section being inclined to the direction of movement of said valve body, and a pin, received in said slot in following engagement with said cam track sections, said pin being slidably laterally in said slot in response to movement of said valve body in a first direction from said first position towards said second position and following engagement of said pin along said first cam track section, said pin engaging along said second cam track section to lock said valve body in said second position in response to further movement of said valve body.

2. Apparatus according to claim 1 wherein said biasing means is operable to bias said valve body for movement toward its first position, said actuating means including a push key movable toward said housing to move said valve body toward its second position against the bias of said biasing means, said locking means being operable to lock said closure body in said second position against the bias of said biasing means.

3. Apparatus according to claim 1 wherein said biasing means is operable to bias said valve body for movement toward its first position, said valve body being movable linearly from said first position through said second position into an intermediate position and back into said second position in response to a first actuation of said actuation means, said locking means being operable to lock said valve body in said second position in response to movement of said valve body back into said second position.

4. Apparatus according to claim 3 wherein said actuating means includes a push key movable towards said housing upon consecutive actuations thereof to lock said valve body in said second position and release said valve body from said second position for movement toward said first position.

5. Apparatus according to claim 1 wherein said cam includes a third cam track section inclined to the direction of movement of said valve body, said pin being slidable laterally in said slide slot and away from said second cam track section in response movement of said valve body in said first direction and engagement of said pin along said third cam track section to release said valve body from its locked second position.

6. Apparatus according to claim 1 wherein said valve body is movable in a second direction opposite said first direction when said pin engages along said second cam track section.

7. Apparatus according to claim 1 further comprising means for continuously braking the lateral movement of said pin.

8. Apparatus according to claim 7 wherein said means for braking includes a tube in bearing engagement along said pin.

* * * * *